(12) United States Patent
Nishina

(10) Patent No.: US 7,760,344 B2
(45) Date of Patent: Jul. 20, 2010

(54) OPTICAL SAMPLING APPARATUS

(75) Inventor: Shigeki Nishina, Tokyo (JP)

(73) Assignee: Advantest Corp., Tokyo (JP)

( * ) Notice: Subject to any disclaimer, the term of this patent is extended or adjusted under 35 U.S.C. 154(b) by 304 days.

(21) Appl. No.: 12/036,303

(22) Filed: Feb. 25, 2008

(65) Prior Publication Data

US 2009/0051918 A1 Feb. 26, 2009

(30) Foreign Application Priority Data

Feb. 26, 2007 (JP) .............................. 2007-045683

(51) Int. Cl.
*G01J 11/00* (2006.01)
(52) U.S. Cl. ...................................... 356/121
(58) Field of Classification Search ................. 356/121
See application file for complete search history.

(56) References Cited

U.S. PATENT DOCUMENTS

2006/0159463 A1* 7/2006 Futami et al. ............... 398/152

FOREIGN PATENT DOCUMENTS

JP    2006-194842    7/2006

* cited by examiner

*Primary Examiner*—F. L Evans
(74) *Attorney, Agent, or Firm*—Jianq Chyun IP Office

(57) ABSTRACT

Provided is an optical sampling apparatus that samples light to be measured having a pulse waveform, including a sampling light output section that outputs a first sampling light and a second sampling light, both having pulse waveforms of a spectrum different from that of the light to be measured; a first sampling section that includes a first nonlinear optical medium, which causes a nonlinear optical effect by causing at least a portion of the light to be measured and the first sampling light to pass therethrough and outputs light generated by the nonlinear optical effect, and that outputs at least a portion of the light generated by the nonlinear optical effect as a first output light; and a second sampling section that includes a second nonlinear optical medium, which causes a nonlinear optical effect by causing at least a portion of the first output light and the second sampling light to pass therethrough with a temporal overlap in order to output light generated by the nonlinear optical effect, and that outputs at least a portion of the light generated by the nonlinear optical effect as a second output light.

11 Claims, 12 Drawing Sheets

US 7,760,344 B2

OPTICAL SAMPLING APPARATUS

CROSS REFERENCE TO RELATED APPLICATION

The present application claims priority from a Japanese Patent Application No. 2007-045683 filed on Feb. 26, 2007, the contents of which are incorporated herein by reference.

BACKGROUND

1. Technical Field

The present invention relates to an optical sampling apparatus. In particular, the present invention relates to an optical sampling apparatus used in measurement of an optical pulse waveform by an optical sampling oscilloscope, or the like.

2. Related Art

Measurement of an optical pulse waveform is not only necessary for evaluating quality of an optical signal at a receiving end in optical communication, but can also be used to monitor signal quality in a node of an optical network or a signal relay device. Along with increased capacity of fiber optic communication, progress is being made in commercialization of next-generation fiber optic communication systems that can transmit and receive signal light at a bit rate of 160 Gb/s or more. To realize such a high capacity communication system, an apparatus that accurately measures a pulse waveform of the optical signal with the high bit rate described above is essential.

As an apparatus that measures the optical pulse waveform having a bit rate of 160 Gb/s or more, an apparatus that measures the light pulse waveform based on intensity correlation signal light obtained by mixing the light to be measured and the sampling light and inputting the mixed light into a nonlinear medium to cause a nonlinear optical effect is known as in, for example, Japanese Patent Application Publication No. 2006-194842.

In the measurement described above, it is necessary to input as the sampling light pulse light having a shorter duration in order to measure the pulse waveform of the light to be measured with a higher time resolution. However, the intensity correlation signal obtained using the light to be measured and the sampling light having the short duration has a low signal strength, so that the S/N ratio is low, which results in difficulty in performing the measurement with a high sensitivity.

SUMMARY

Therefore, it is an object of an aspect of the innovations herein to provide an optical sampling apparatus, which is capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary apparatus may include an optical sampling apparatus that samples light to be measured having a pulse waveform, including a sampling light output section that outputs a first sampling light and a second sampling light, both having pulse waveforms of a spectrum different from that of the light to be measured; a first sampling section that includes a first nonlinear optical medium, which causes a nonlinear optical effect by causing at least a portion of the light to be measured and the first sampling light to pass therethrough and outputs light generated by the nonlinear optical effect, and that outputs at least a portion of the light generated by the nonlinear optical effect as a first output light; and a second sampling section that includes a second nonlinear optical medium, which causes a nonlinear optical effect by causing at least a portion of the first output light and the second sampling light to pass therethrough with a temporal overlap in order to output light generated by the nonlinear optical effect, and that outputs at least a portion of the light generated by the nonlinear optical effect as a second output light.

According to a second aspect related to the innovations herein, one exemplary apparatus may include an optical sampling apparatus that samples light to be measured having a pulse waveform, including a sampling light output section that outputs a first sampling light and a second sampling light, both having pulse waveforms of a spectrum different from that of the light to be measured, a first sampling section, and a second sampling section. The first sampling section includes a first light receiving section that receives the light to be measured; a second light receiving section that receives the first sampling light; and a first optical medium that generates a first output light created from the light to be measured and the first sampling light, and that outputs the generated first output light. The second sampling section is connected serially to the first sampling section, and includes a first light receiving section that receives the first output light; a second light receiving section that receives the second sampling light; and a second nonlinear optical medium that generates a second output light from the first output light and at least a portion of the second sampling light that passes through at the having a temporal overlap with the first sampling light, and that outputs the generated second output light.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 3A shows a spectrum waveform and a time waveform of the pulse light input to the spectrum spreading section 42. FIG. 3B shows a spectrum waveform and a time waveform of the pulse light that is output from the spectrum spreading section 42 to be input to the pulse compressing section 44. FIG. 3C shows a spectrum waveform and a time waveform of the pulse light output from the pulse compressing section 44.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
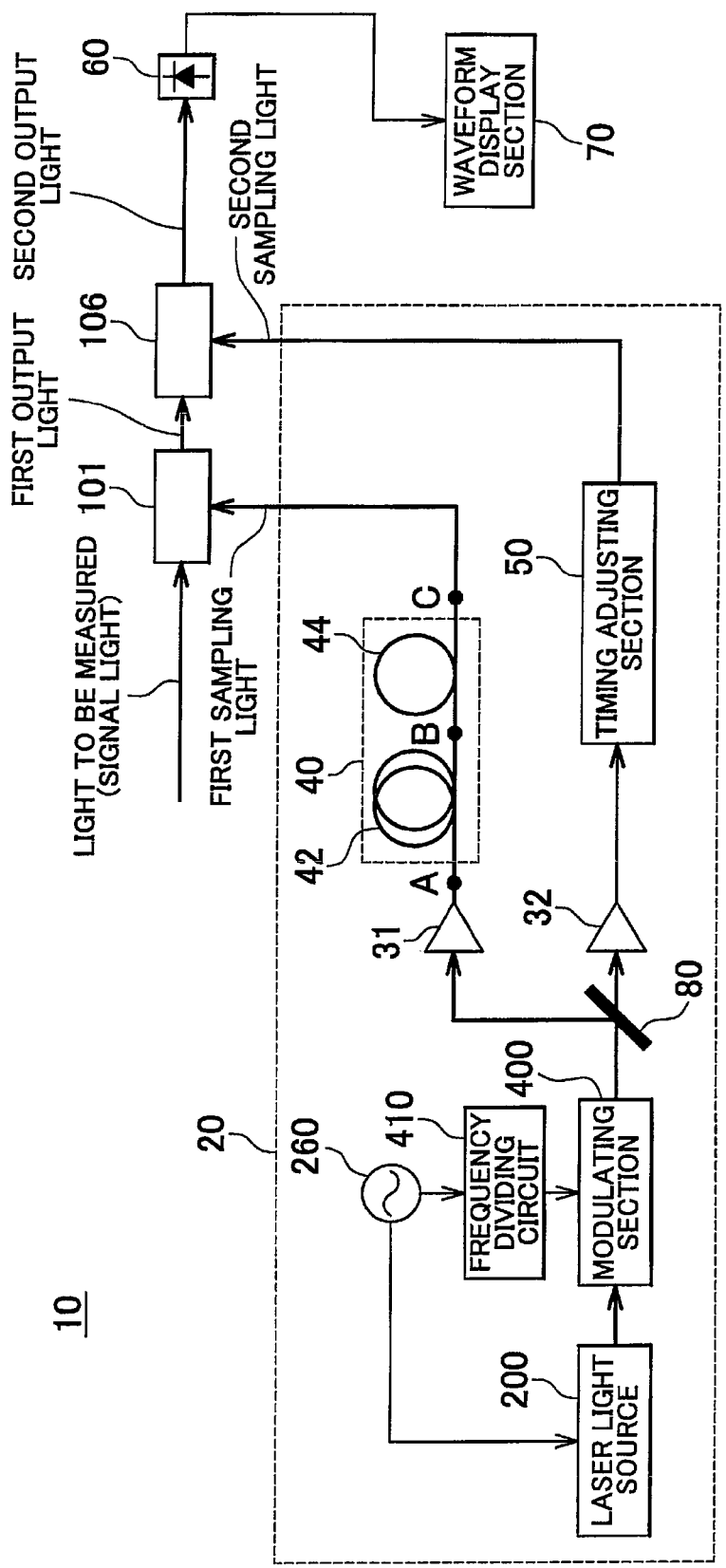
FIG. 1 is a schematic view showing a configuration of the optical sampling apparatus 10.

FIG. 1 is a schematic view showing a configuration of an optical sampling apparatus 10 that can sample light to be measured (signal light) having a pulse waveform. As shown in FIG. 1, the optical sampling apparatus 10 of the present embodiment is provided with a sampling light output section 20 that includes amplifiers 31, 32, a sampling light width adjusting section 40, a timing adjusting section 50, an optical brancher 80, a laser light source 200, a high frequency current output section 260, a modulating section 400, and a frequency dividing circuit 410.

Figure 2:
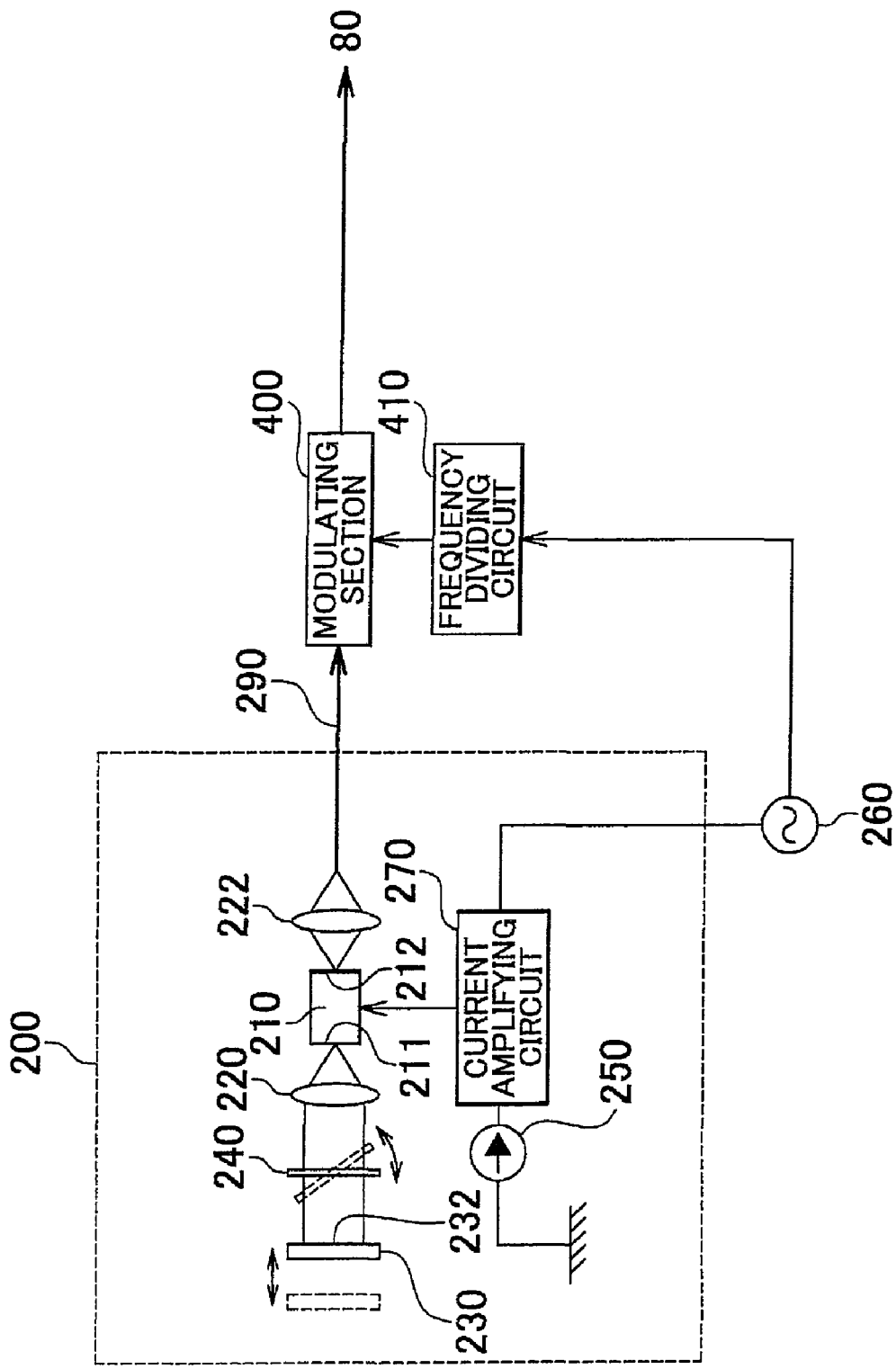
FIG. 2 is a schematic view showing an area including the laser light source 200, the high frequency current output section 260, the modulating section 400, and the frequency dividing circuit 410 extracted from the optical sampling apparatus 10 shown in FIG. 1.

FIG. 2 is a schematic view showing an area including the laser light source 200, the high frequency current output section 260, the modulating section 400, and the frequency dividing circuit 410 extracted from the optical sampling apparatus 10 shown in FIG. 1. Furthermore, FIG. 2 shows a detailed configuration of the laser light source 200.

The laser light source 200 is a pulse light source that outputs a single-mode pulse light, and includes a laser diode 210, a collimating lens 220, a converging lens 222, a mirror 230, an optical band pass filter 240, a bias current output section 250, and a current amplifying circuit 270, as shown in FIG. 2.

As shown in FIG. 2, the high frequency current output section 260 is electrically connected to the current amplifying circuit 270 of the laser light source 200 and the frequency dividing circuit 410. The high frequency current output section 260 outputs a high frequency current having a specified frequency. The frequency of the high frequency current output by the high frequency current output section 260 can be changed as desired.

The bias current output section 250 outputs a direct current of a specified size as a bias current. The size of the bias current output by the bias current output section 250 can be changed as desired. The current amplifying circuit 270 adds to the laser diode 210 a current obtained by superimposing the high frequency current output from the high frequency current output section 260 onto the bias current output from the bias current output section 250.

The laser diode 210 emits a pulse of laser light (referred to hereinafter as "pulse light") according to the current added thereto by the current amplifying circuit 270. The laser diode 210 has a pair of end surfaces, one of which is a low reflective surface 211 that is barely reflective and the other of which is a highly reflective surface 212 that has a reflective index greater than or equal to 30%. The pulse light oscillated by the laser diode 210 is output from the low reflective surface 211 to the outside of the laser diode 210.

The collimating lens 220 is disposed on the low reflective surface 211 side of the laser diode 210 and collimates the pulse light output from the low reflective surface 211 side of the laser diode 210. The mirror 230 has a completely reflective surface 232 formed on one surface thereof, and completely reflects the collimated pulse light using the completely reflective surface 232. The optical band pass filter 240 is disposed between the collimating lens 220 and the mirror 230 in an optical path of the pulse light, and allows a component of a band centered on the oscillation wavelength to pass through, from among spectrum components of the pulse light. The optical band pass filter 240 is mounted in a rotatable manner and can change an angle at which the transparent surface thereof faces the optical path such that the pulse light diagonally enters the transparent surface of the optical band pass filter 240. Accordingly, the optical band pass filter 240 can set the band of the light passing therethrough according to the angle.

After the pulse light, which is emitted as a pulse by the laser diode 210, passes through the collimating lens 220 and the optical band pass filter 240 to be completely reflected by the completely reflective surface 232 of the mirror 230, the pulse light is reflected by the highly reflective surface 212 of the laser diode 210. Accordingly, the pulse light is bounced between the highly reflective surface 212 of the laser diode 210 and the completely reflective surface 232 of the mirror 230. By setting the distance between the highly reflective surface 212 and the completely reflective surface 232 such that the period of one back and forth bouncing of the pulse light between the highly reflective surface 212 and the completely reflective surface 232 is synchronized with the period of pulse emission by the laser diode 210, the pulse light is amplified and a portion thereof is output from the highly reflective surface 212 of the laser diode 210.

The converging lens 222 is disposed to face the highly reflective surface 212 of the laser diode 210 and concentrates the pulse light output from the highly reflective surface 212 of the laser diode 210 to inject the concentrated pulse light into the optical fiber 290. The optical fiber 290 is connected to the outside of the laser light source 200 and outputs the pulse light to the outside of the laser light source 200.

The modulating section 400 is disposed in the optical path of the pulse light output from the laser light source 200, and is electrically connected to the frequency dividing circuit 410. The frequency dividing circuit 410 frequency divides the high frequency electrical signal output from the high frequency current output section 260 into N periods (N is a positive integer) and outputs the resulting electrical signal to the modulating section 400. The modulating section 400 outputs pulse light obtained by frequency dividing a repeating period of the pulse light by n, according to the frequency of the electrical signal input from the frequency dividing circuit 410. Here, the repeating frequency of the pulse light is defined as an inverse of the repeating period of the pulse light. The modulating section 400 is an LN intensity modulator using a $LiNbO_3$ optical waveguide, for example, that can reliably respond to the high frequency electrical signal having a frequency of tens of GHz to frequency divide the repeating frequency of the pulse light.

An oscillation wavelength of the laser diode 210, in other words, the wavelength of the pulse light output from the laser light source 200, is a wavelength of a cutoff band of a second color filter 142 of a second sampling section 106 and a first color filter 141 of a first sampling section 101, described hereinafter, and it is desirable that the oscillation wavelength of the laser diode 210 be a wavelength that is close to the oscillation wavelength of the light to be measured, which is sampled by the optical sampling apparatus 10. Furthermore, it is desirable that when the frequency of the light to be measured, which is sampled by the optical sampling apparatus 10, is $f_0$, the repeating frequency of the pulse light output from the laser light source 200 be shifted from a frequency, obtained by frequency dividing the frequency $f_0$ by N, by a frequency ($\Delta f$) for sweeping.

The optical brancher 80 disperses the pulse light output from the optical sampling apparatus 10 and inputs one of the resulting portions to the amplifier 31 while inputting the other resulting portion to the amplifier 32. A desired spectroscopic section, such as a non-polarized beam splitter, can be used as the optical brancher 80. In the following description, the first dispersed portion input into the amplifier 31 and the second dispersed portion input into the amplifier 32, from among the pulse lights obtained through dispersion by the optical brancher 80, are referred to as a first sampling light and a second sampling light, respectively.

When the first sampling light obtained through the dispersion by the optical brancher 80 is input into the amplifier 31, the amplifier 31 amplifies the peak intensity of the first sampling light. When the second sampling light obtained through the dispersion by the optical brancher 80 is input into the amplifier 32, the amplifier 32 amplifies the peak intensity of the second sampling light. The amplifier 31 and the amplifier 32 may be erbium-doped fiber amplifiers (EDFA), for example.

The sampling light width adjusting section 40 includes a spectrum spreading section 42 and a pulse compressing section 44, as shown in FIG. 1. The spectrum spreading section 42 may be a highly-nonlinear fiber (HNLF), for example, that spreads the spectrum of the first sampling light, whose peak intensity is amplified by the amplifier 31, by causing a self-phase modulation therein. The pulse compressing section 44 may be a single mode fiber (SMF), for example, that compresses, through dispersion compensation, the duration of the first sampling light whose spectrum is spread by the spectrum spreading section 42. The length of the highly-nonlinear fiber used as the spectrum spreading section 42 and the length of the single mode fiber used as the pulse compressing section 44 may be 10 m and 15 m, respectively, for example.

Figure 3:
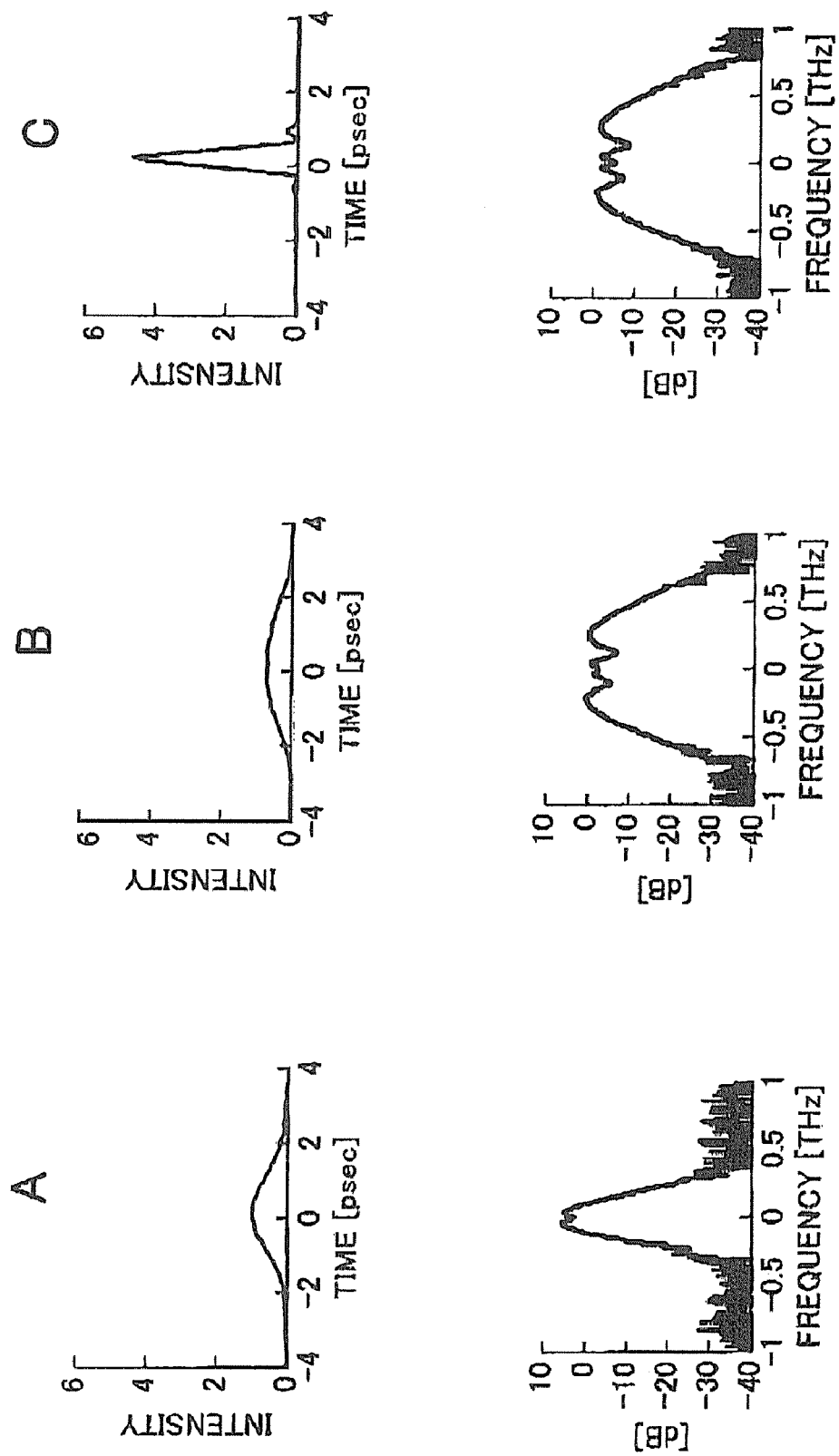
FIG. 3 shows a result of a nonlinear transmission simulation for compressing the duration of the first sampling light input from the spectrum spreading section 42 side in the sampling light width adjusting section 40.

FIG. 3 shows a result of a nonlinear transmission simulation for compressing the duration of the first sampling light input from the spectrum spreading section 42 side in the sampling light width adjusting section 40. In the nonlinear transmission simulation, the first sampling light has a duration of approximately 2.7 psec and a spectrum width of approximately 165 GHz. FIG. 3A shows a spectrum waveform and a time waveform of the pulse light input to the spectrum spreading section 42. FIG. 3B shows a spectrum waveform and a time waveform of the pulse light that is output from the spectrum spreading section 42 to be input to the pulse compressing section 44. FIG. 3C shows a spectrum waveform and a time waveform of the pulse light output from the pulse compressing section 44.

As shown in FIGS. 3A-C, the spectrum width of the pulse light is increased to approximately 680 GHz by the spectrum spreading section 42. The duration of the pulse light whose spectrum is increased in such a manner is compressed by the pulse compressing section 44 to be approximately 0.7 psec. In this manner, by being provided with the sampling light width adjusting section 40, the laser light output apparatus 15 can output the first sampling light whose duration is compressed to an order of sub-picoseconds.

The timing adjusting section 50 controls a timing at which the second sampling light passes through the second optical fiber 122, described hereinafter, which is a nonlinear optical medium disposed in the second sampling section 106. More specifically, the timing adjusting section 50 controls the timing at which the second sampling light is input into the second optical fiber 122 of the second sampling section 106 such that the second sampling light passes through the second optical fiber 122 of the second sampling section 106 having a temporal overlap with a first output light, described hereinafter, output from the first sampling section 101.

In the sampling light output section 20 described above, the amplitudes of the high frequency current output from the high frequency current output section 260 and the bias current output from the bias current output section 250 are constant when the light to be measured is being sampled. Accordingly, the intensities of the first sampling light and the second sampling light output from the sampling light output section 20 are held constant.

The intensity of the pulse light output from the laser light source 200 can be adjusted using a method such as controlling the amplitude of the high frequency current output from the high frequency current output section 260. Furthermore, the ratio of the amplification of the peak intensities in the amplifier 31 and the amplifier 32 can be set as desired. Therefore, the sampling light output section 20 can suitably set the intensities of the output first sampling light and second sampling light.

As shown in FIG. 1, the optical sampling apparatus 10 is further provided with the first sampling section 101, into which are input the light to be measured, which is input from the outside, and the first sampling light output from the sampling light output section 20, and the second sampling section 106, into which are input the first output light, which is output from the first sampling section 101, and the second sampling light output from the sampling light output section 20.

Figure 4:
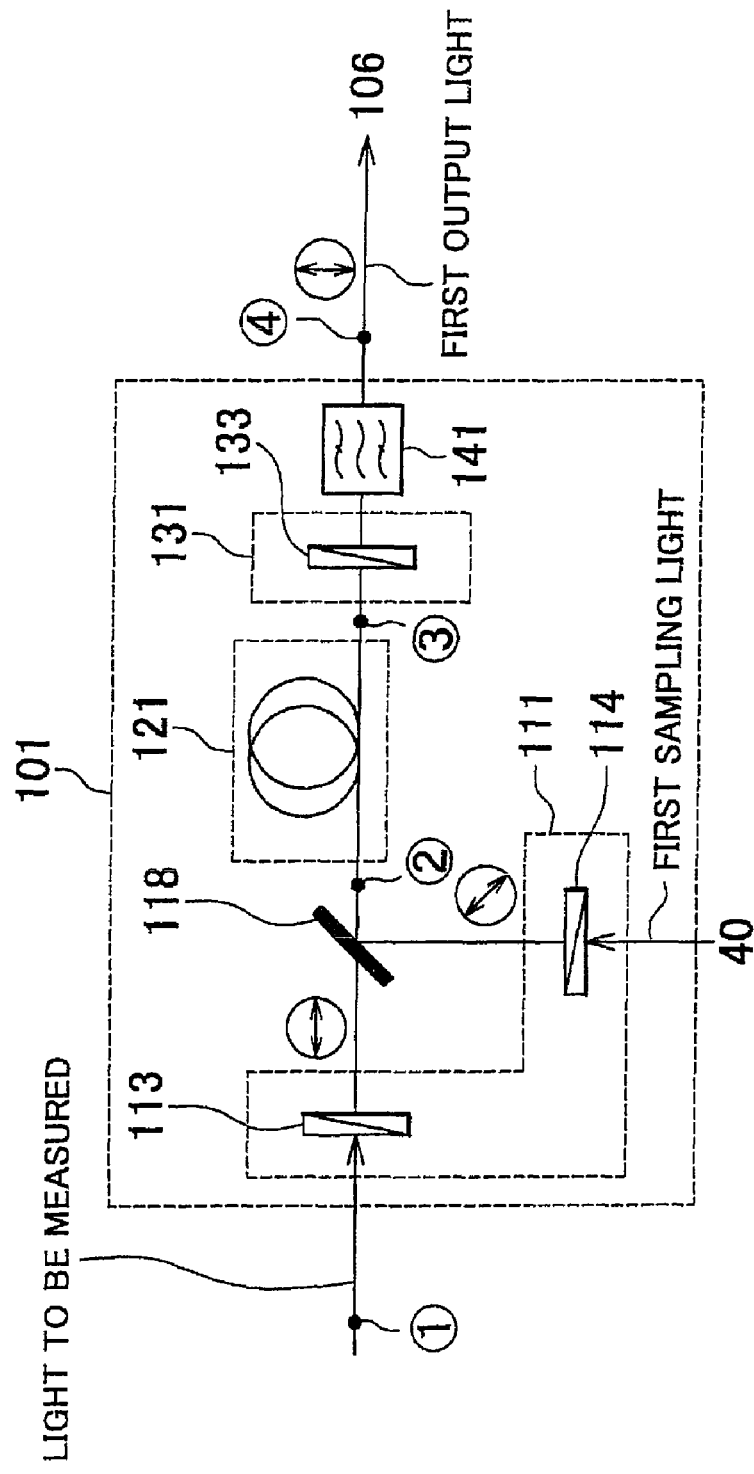
FIG. 4 is a block diagram showing a configuration of the first sampling section 101.
Figure 5:
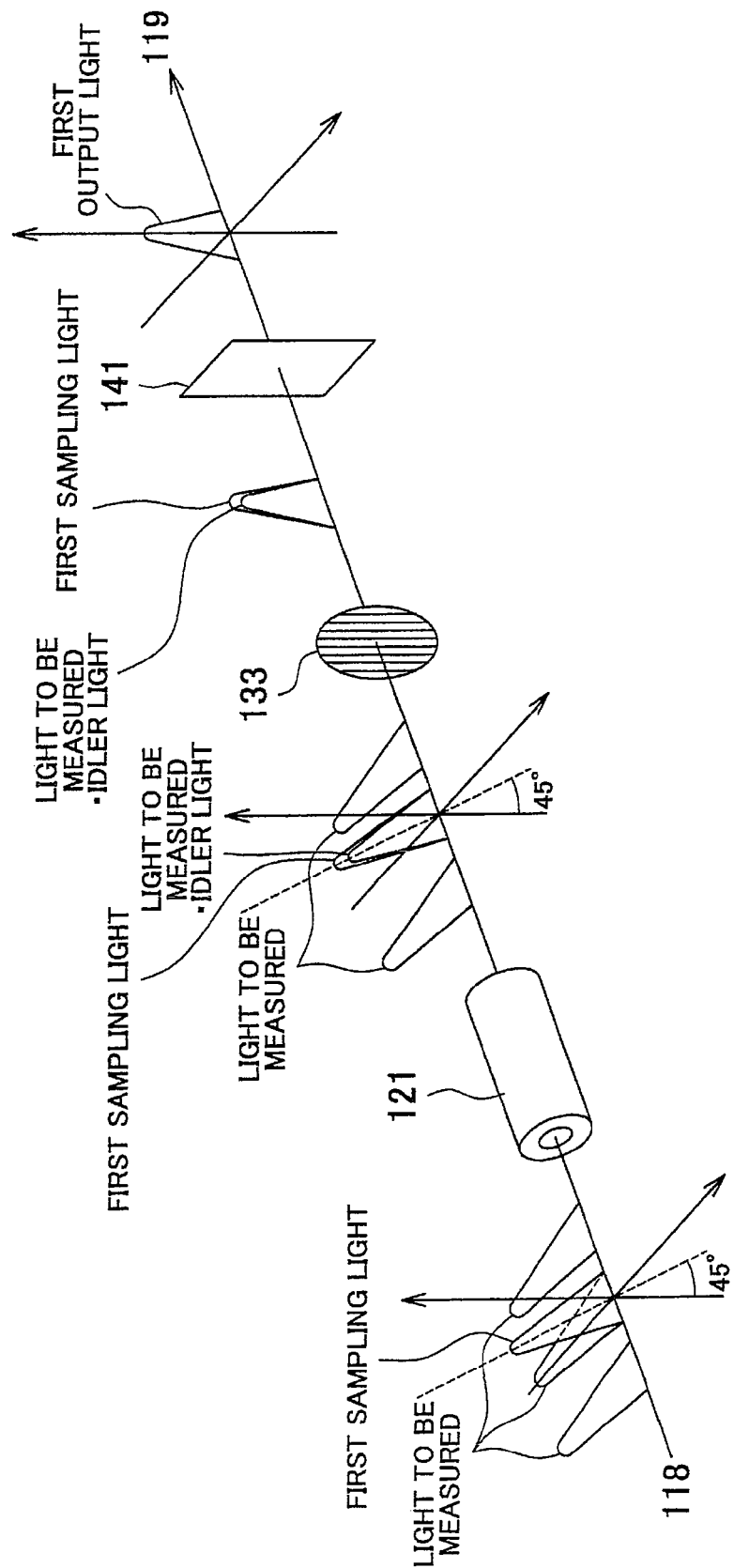
FIG. 5 is a schematic view showing a manner in which the light to be measured by the first sampling section 101 is sampled using the first sampling light.
Figure 6:
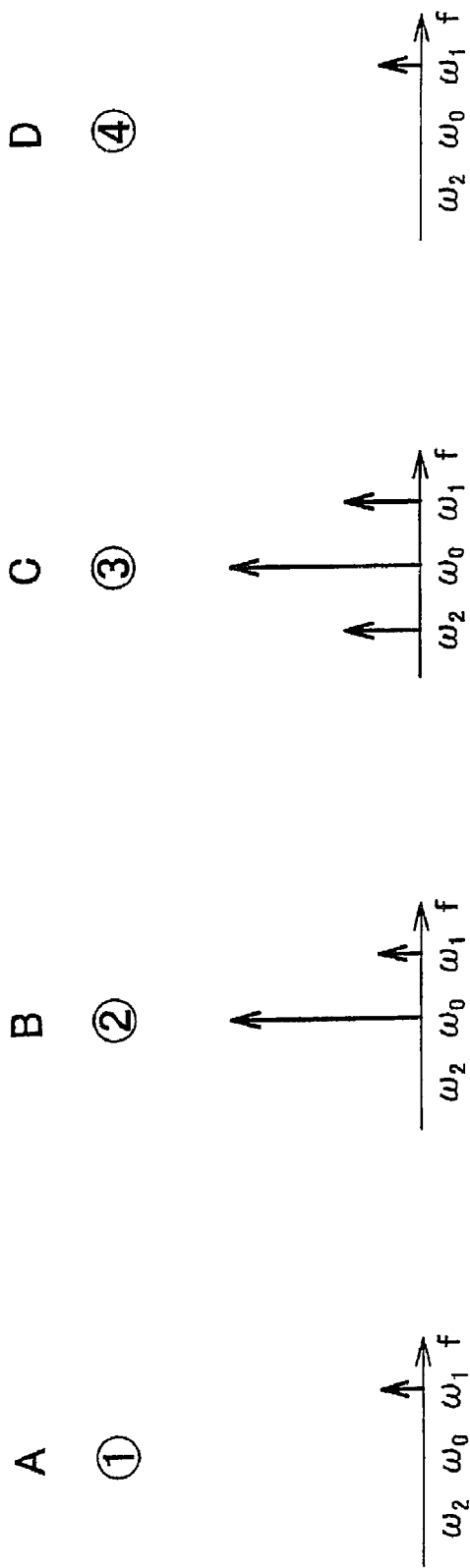
FIG. 6A shows the intensity of the light passing through, with temporal overlap, the position indicated by encircled number 1 for each optical frequency in the block diagram of the first sampling section 101 shown in FIG. 4.
FIG. 6B shows the intensity of the light passing through, with temporal overlap, the position indicated by encircled number 2 for each optical frequency in the block diagram of the first sampling section 101 shown in FIG. 4.
FIG. 6C shows the intensity of the light passing through, with temporal overlap, the position indicated by encircled number 3 for each optical frequency in the block diagram of the first sampling section 101 shown in FIG. 4.
FIG. 6D shows the intensity of the light passing through, with temporal overlap, the position indicated by encircled number 4 for each optical frequency in the block diagram of the first sampling section 101 shown in FIG. 4.

FIG. 4 is a block diagram showing a configuration of the first sampling section 101. FIG. 5 is a schematic view showing a manner in which the light to be measured by is sampled the first sampling section 101 using the first sampling light. The first sampling section 101 includes a first input side polarization control section 111, an optical coupler 118, a first optical fiber 121, a first output side polarizing section 131, and a first color filter 141, as shown in FIG. 4.

The first input side polarization control section 111 includes a polarization control element 113 and a polarization control element 114. The light to be measured, which is input to the first sampling section 101 from the outside, is input into the polarization control element 113 in an unaltered manner. The first sampling light, which is output from the sampling light output section 20 to be input to the first sampling section 101, is input into the polarization control element 114 in an unaltered manner. The first input side polarization control section 111 controls the polarization directions of the light to be measured that is input to the polarization control element 113 and the first sampling light that is input to the polarization control element 114 such that the light to be measured and the first sampling light become linearly polarized light with an angle of 40~50 degrees therebetween. The light to be measured and the first sampling light, whose polarization directions are controlled by the first input side polarization control section 111, are output towards the optical coupler 118 from the polarization control element 113 and the polarization control element 114, respectively.

In FIG. 4, the polarization directions of the light to be measured and the first sampling light, which are output from the polarization control element 113 and the polarization control element 114, respectively, are indicated by encircled arrows at output sides of the polarization control element 113 and the polarization control element 114. As shown in FIG. 4, in the present embodiment, the polarization directions of the light to be measured and the first sampling light output from the polarization control element 113 and the polarization control element 114 of the first input side polarization control section 111, respectively, form an angle therebetween of approximately 45 degrees. At this time, the polarization direction of the light to be measured that is output from the polarization control element 113 is substantially horizontal, and the polarization direction of the first sampling light that is output from the polarization control element 114 is at an angle of substantially 45 degrees from the horizontal.

The optical coupler 118 couples the light to be measured that is output from the polarization control element 113 and the first sampling light that is output from the polarization control element 114, and outputs the resulting light to the first optical fiber 121. The optical coupler 118 may be a half mirror, a beam splitter, or the like, for example.

When at least a portion of the input light to be measured and first sampling light pass through inside of the first optical fiber 121 with a temporal overlap, nonlinear optical effects including an optical Kerr effect and four-wave mixing occur between the input lights. More specifically, as shown in FIG. 5, when at least a portion of a prescribed pulse of the light to be measured and a prescribed pulse of the first sampling light pass through inside the first optical fiber 121 with a temporal overlap, the polarization axis of the pulse of the light to be measured is rotated by the optical Kerr effect, such that the polarization direction of the pulse of the light to be measured becomes substantially the same as the polarization direction of the pulse of the first sampling light. The first optical fiber 121 may be a highly nonlinear fiber that has an average zero-dispersion wavelength that is substantially equal to the wavelength of the first sampling light and has a nonlinearity constant that is approximately 20 (/W/km), for example.

Here, the rotation of the polarization axis of the light to be measured as described above does not occur in all of the light to be measured, but rather occurs only in the portion of the light to be measured that temporally overlaps with the first sampling light. Accordingly, in a case where, for example, the duration of the pulse of the first sampling light is shorter than the duration of the pulse of the light to be measured, only the portion of the pulse of the light to be measured that temporally overlaps the pulse of the first sampling light has the polarization axis thereof rotated in the manner described above, such that the polarization direction of the aforementioned portion becomes substantially the same as that of the first sampling light.

FIGS. 6A-D show the intensity of the light passing through, with temporal overlap, the position indicated by encircled numbers 1~4 for each optical frequency in the block diagram of the first sampling section 101 shown in FIG. 4. In FIGS. 6A-D, the horizontal axis represents optical frequency, and $\omega 0$, $\omega 1$, and $\omega 2$ represent the optical frequencies of the first sampling light, the light to be measured (encircled number 4 is the first output light), and the idler light, respectively. In FIGS. 6A-D, the length that the arrows extend in a direction perpendicular to the horizontal axis represents the intensities of the light of the respective optical frequencies.

In a case where the intensity of the first sampling light is much larger than that of the light to be measured, the intensity of the portion of the light to be measured passing through the first optical fiber 121 whose polarization axis is rotated in the manner described above, in other words, the intensity of the portion of the light to be measured that temporally overlaps with the first sampling light is amplified, as shown in FIGS. 6B and 6C. This amplification results from the aforementioned portion of the light to be measured being amplified by optical parametric amplification caused by the four-wave mixing in the first optical fiber 121. Here, the light obtained through amplification of the portion of the light to be measured by the optical parametric amplification is linearly polarized light having an optical frequency (wavelength) that is the same as that of the light to be measured, and the polarization direction thereof is substantially the same as that of the first sampling light. Accordingly, the polarization direction of the amplified portion of the light to be measured has an angle of 45 degrees from the horizontal.

In the manner described above, when portions of the light to be measured and the first sampling light passing through the first optical fiber 121 temporally overlap, the portion of the light to be measured that passes through the first optical fiber 121 becomes light whose intensity is amplified and whose polarization direction is substantially the same as that of the first sampling light. When the intensity of the first sampling light is constant, the intensity of the amplified portion of the light to be measured has a correlation with the intensity of the portion of the light to be measured before amplification.

In the manner described above, when portions of the light to be measured and the first sampling light passing through the first optical fiber 121 temporally overlap, the idler light having a temporal overlap with the portions of the light to be measured and the first sampling light is newly generated through the four-wave mixing, as shown in FIGS. 6A-D. The idler light is generated as linearly polarized light whose polarization direction is substantially the same as that of the first sampling light. Accordingly, the polarization direction of the idler light has an angle of substantially 45 degrees from the horizontal. The intensity of the idler light is the same as the intensity of the amplified portion of the light to be measured whose polarization direction is rotated to be substantially the same as that of the first sampling light. Therefore, in a case where the intensity of the first sampling light is constant, the intensity of the idler light also has a correlation with the intensity of the portion of the light to be measured before amplification.

A difference between the optical frequency $\omega_1$ of the light to be measured and the optical frequency $\omega_0$ of the first sampling light is equal to a difference between the optical frequency $\omega_2$ of the idler light and the optical frequency $\omega_0$ of the first sampling light.

The first output side polarizing section 131 includes a polarization element 133 that is disposed on the optical path of the light passing through the first optical fiber 121. The polarization element 133 absorbs light components whose polarization directions are horizontal from among the input light and allows light components whose polarization directions are vertical (perpendicularly crossing the horizontal direction) to pass through. Accordingly, the first sampling light that passes through the first optical fiber 121 has a vertical component that passes through the polarization element 133, as shown in FIG. 5. Furthermore, the portions of the light to be measured passing through the first optical fiber 121 that do not temporally overlap with the first sampling light in the first optical fiber 121 are absorbed by the polarization element 133.

On the other hand, the polarization directions of the portions of the light to be measured that do temporally overlap with the first sampling light in the first optical fiber 121 are rotated in the manner described above such that the polarization directions are substantially the same as that of the first sampling light, in other words, the polarization directions are rotated to be at an angle of substantially 45 degrees from the horizontal, so that the vertical component of the light to be measured passes through the polarization element 133. Furthermore, because the idler light generated in the first optical fiber 121 has a polarization direction that is the same as that of the first sampling light, the vertical component of the idler light passes through the polarization element 133.

The first color filter 141 is disposed on the optical path of the light that passes through the polarization element 133 of the first output side polarizing section 131, and has characteristics that allow only light having a wavelength with a band that is the same as the wavelength $\lambda_1$ of the light to be measured to pass through. Therefore, from the light passing through the polarization element 133, the components of the first sampling light and of the idler light having wavelengths that are different from the wavelength $\lambda_1$ of the light to be measured are absorbed by the first color filter 141, so that only the components having wavelengths that are the same as the wavelength $\lambda_1$ of the light to be measured pass through the first color filter 141. In the following description, the light that passes through the first color filter 141 is referred to as the "first output light."

It should be noted that the first color filter 141 may have characteristics that allow only light having a wavelength with a band that is the same as the wavelength $\lambda_2$ of the idler light to pass through. In such a case, the first sampling light and the light to be measured components are absorbed by the first color filter 141, so that the idler light component passes through the first color filter 141 to become the first output light. Furthermore, in such a case, the wavelength and intensity of the idler light are in correlation with those of the light to be measured, as described above, and therefore the first output light made up of the idler light component corresponds to the light to be measured.

In the first sampling section 101, the portion of the light to be measured that does not temporally overlap with the first sampling light in the first optical fiber 121 is absorbed by the polarization element 133. Therefore, the SN ratio of the first output light obtained by sampling the pulse waveform of the light to be measured can be increased.

Furthermore, because the light to be measured can be sampled with the first sampling light having a very short duration by the first sampling section 101 due to the sampling light output section 20 outputting the pulse light at an order of sub-picoseconds as the first sampling light, time resolution of the sampling of the light to be measured by the first sampling section 101 can be enhanced to an order of sub-picoseconds.

Figure 7:
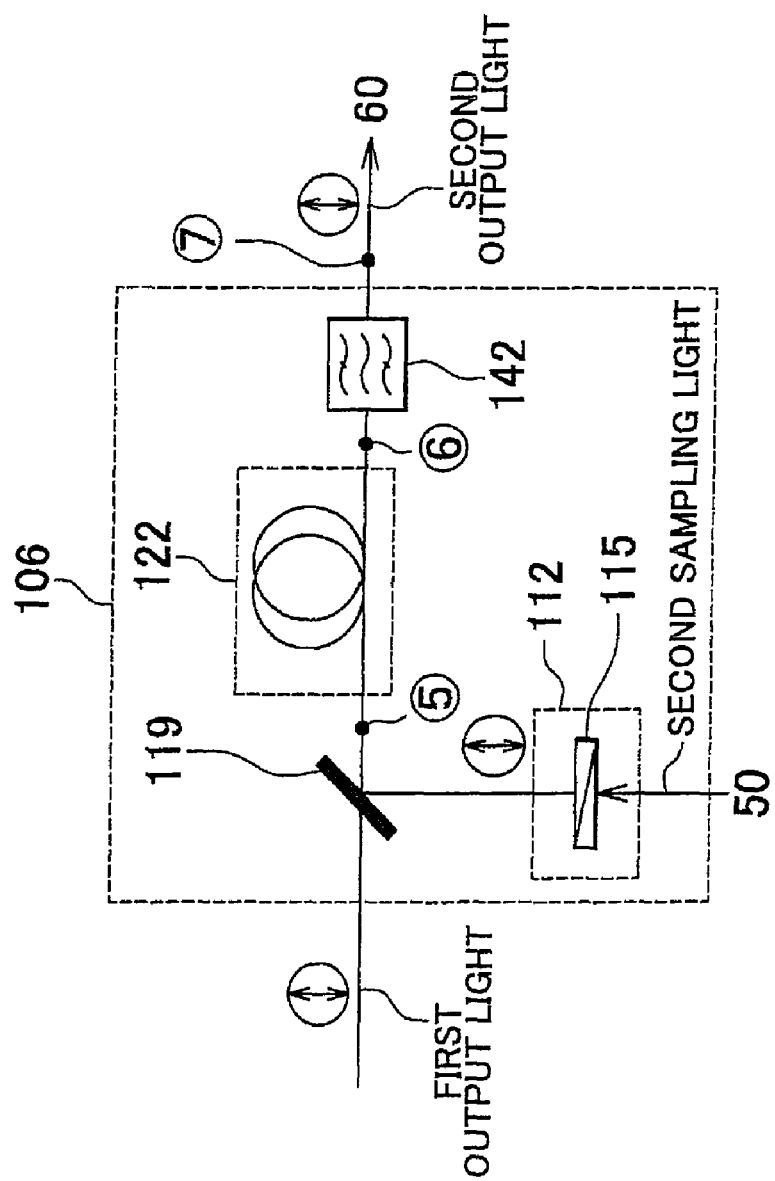
FIG. 7 is a block diagram showing a configuration of the second sampling section 106.
Figure 8:
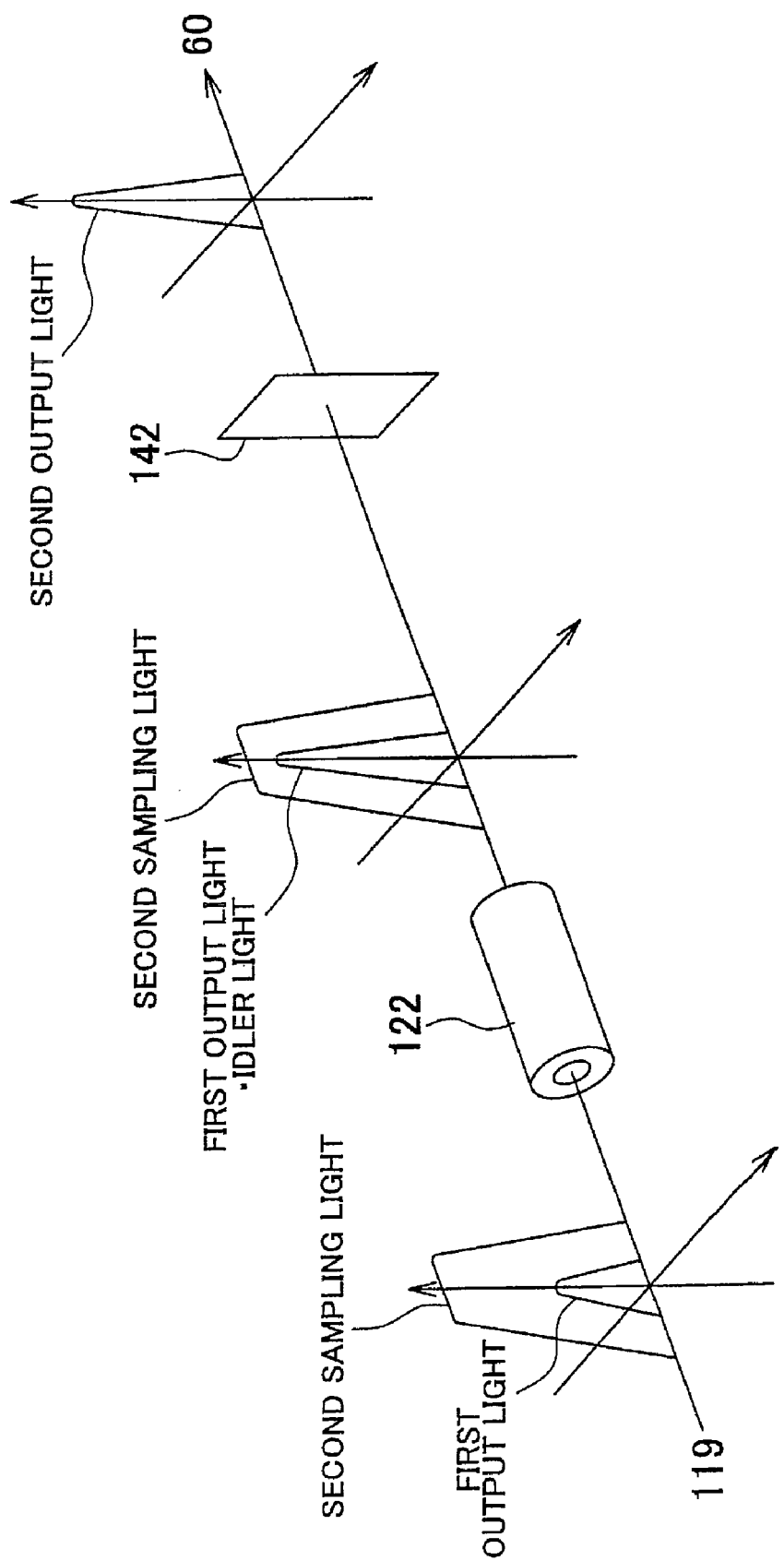
FIG. 8 is a schematic diagram showing a manner in which the second sampling section 106 performs optical parametric amplification of the first output light by using the second sampling light.

FIG. 7 is a block diagram showing a configuration of the second sampling section 106. In FIG. 7, the direction of the encircled arrows indicate the polarization directions of the second sampling light output from a polarization control element 115, described hereinafter, and the first output light. FIG. 8 is a schematic diagram showing a manner in which the second sampling section 106 performs optical parametric amplification of the first output light by the using the second sampling light. The second sampling section 106 includes a second input side polarization control section 112, an optical coupler 119, a second optical fiber 122, and a second color filter 142, as shown in FIG. 7.

The second input side polarization control section 112 includes the polarization control element 115. The second sampling light, which is output from the sampling light output section 20 to be input to the second sampling section 106, is input into the polarization control element 115 in an unaltered manner. The second input side polarization control section 112 controls the polarization direction of the second sampling light input into the polarization control element 115 such that the polarization direction of the second sampling light becomes the same as that of the first output light. In the present embodiment, because the polarization direction of the first output light is vertical, the second input side polarization control section 112 controls the second sampling light input into the polarization control element 115 such that the polarization direction thereof becomes substantially vertical. The second sampling light whose polarization direction is controlled by the second input side polarization control section 112 is output from the polarization control element 115 toward the optical coupler 119. The second input side polarization control section 112 need not be provided in a case where the polarization direction of the second sampling light output from the sampling light output section 20 is substantially the same as the polarization direction of the first output light. In such a case, the number of components in the first sampling section 101 can be decreased.

The optical coupler 119 couples the first output light and the second sampling light output from the polarization control element 115, and outputs the resulting light to the second optical fiber 122. The optical coupler 119 may be a half mirror, a beam splitter, or the like, for example. In the manner described above, the sampling light output section 20 controls the timing at which the second sampling light is output, such that the second sampling light temporally overlaps with the first output light in the second optical fiber 122. Accordingly, the first output light and the second sampling light coupled by the optical coupler 119 are input into the second optical fiber 122 with a temporal overlap.

Figure 9:
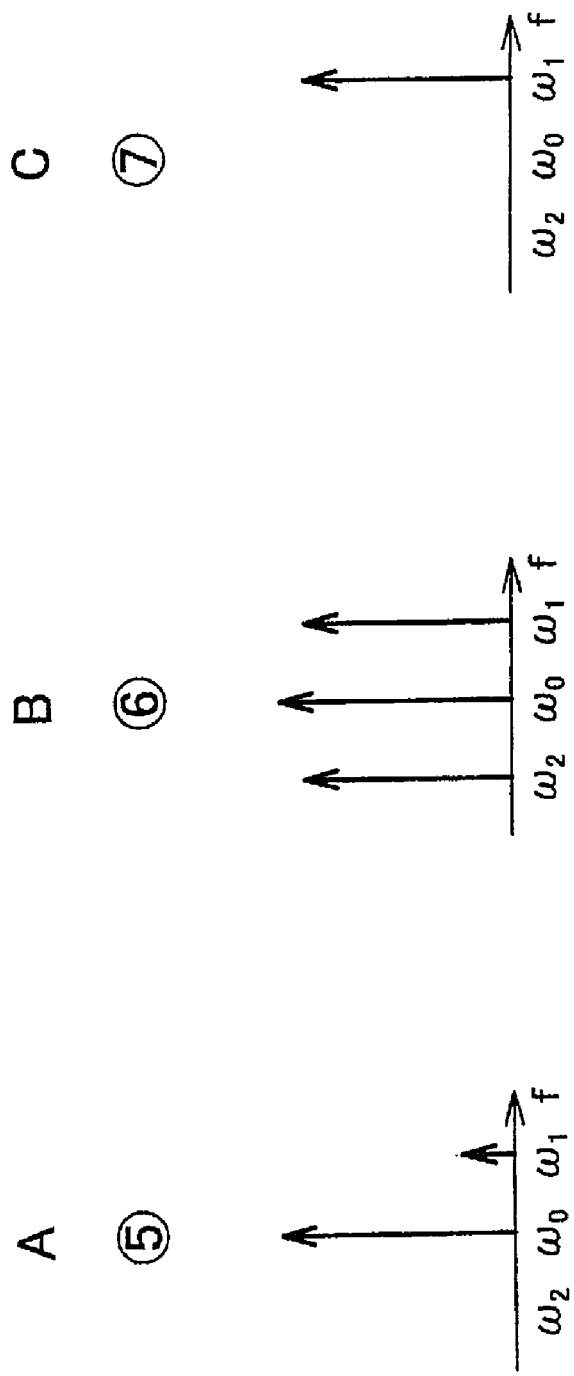
FIG. 9A shows the intensity of the light passing through, with temporal overlap, the position indicated by encircled number 5 for each optical frequency in the block diagram of the second sampling section 106 shown in FIG. 7.
FIG. 9B shows the intensity of t the light passing through, with temporal overlap, the position indicated by encircled number 6 for each optical frequency in the block diagram of the second sampling section 106 shown in FIG. 7.
FIG. 9C shows the intensity of the light passing through, with temporal overlap, the position indicated by encircled number 7 for each optical frequency in the block diagram of the second sampling section 106 shown in FIG. 7.

FIGS. 9A-C show the intensity of the light passing through, with temporal overlap, the position indicated by encircled numbers 5~7 for each optical frequency in the block diagram of the second sampling section 106 shown in FIG. 7. In FIGS. 9A-C, the horizontal axis represents optical frequency, and $\omega 0$, $\omega 1$, and $\omega 2$ represent the optical frequencies of the second sampling light, the first output light (encircled number 7 is the second output light), and the idler light, respectively. In FIGS. 9A-C, the length that the arrows extend in a direction perpendicular to the horizontal axis represents the intensities of the light of the respective optical frequencies.

The second optical fiber 122 causes the four-wave mixing, which is a nonlinear optical effect, to occur between the first output light and the second sampling light passing through inside the second optical fiber 122 with a temporal overlap. In a case where the intensity of the second sampling light is much larger than that of the first output light, the intensity of the portion of the first output light that temporally overlaps with the second sampling light is amplified, as shown in FIGS. 9A and 9B. This amplification results from the aforementioned portion of the first output light being amplified by optical parametric amplification caused by the four-wave mixing in the second optical fiber 122. In the same manner as the first optical fiber 121, the second optical fiber 122 may be a highly nonlinear fiber that has an average zero-dispersion wavelength that is substantially equal to the wavelength of the second sampling light and has a nonlinearity constant that is approximately 20 (/W/km), for example.

In the manner described above, the first output light that passes through the second optical fiber 122 becomes light whose intensity is amplified and whose polarization direction is substantially the same as that of the second sampling light. When the intensity of the second sampling light is constant, the amplified intensity of the first output light has a correlation with the intensity of the first output light before amplification.

As further shown in FIGS. 9A-C, the idler light in which the first output light and the second sampling light temporally overlap is newly generated through the four-wave mixing in the second optical fiber 122. The idler light is generated as linearly polarized light whose polarization direction is substantially the same as that of the first output light and the second sampling light. Accordingly, the polarization direction of the idler light is substantially vertical. The intensity of the idler light is the same as the intensity of the first output light that is amplified by the optical parametric amplification. Therefore, in a case where the intensity of the second sampling light is constant, the intensity of the idler light has a correlation with the intensity of the first output light before amplification.

A difference between the optical frequency $\omega_1$ of the first output light and the optical frequency $\omega_0$ of the second sampling light is equal to a difference between the optical frequency $\omega_2$ of the idler light and the optical frequency $\omega_0$ of the second sampling light.

The second color filter 142 is disposed on the optical path of the light that passes through the second optical fiber 122, and has characteristics that allow light having a wavelength with a band that is the same as the wavelength of the first output light to pass through. Therefore, from the light passing through the second optical fiber 122, the components of the second sampling light and of the idler light having wavelengths that are different from the wavelength $\lambda_1$ of the first output light are absorbed by the second color filter 142, so that only the components having wavelengths that are the same as the wavelength $\lambda_1$ (optical frequency $\omega_1$) of the first output light pass through the second color filter 142. In the following description, the light that passes through the second color filter 142 is referred to as the "second output light."

It should be noted that the second color filter 142 may have characteristics that allow only light having a wavelength with a band that is the same as the wavelength $\lambda_2$ of the idler light to pass through. In such a case, the components of the second sampling light and of the first output light are absorbed by the second color filter 142, so that the idler light component passes through the second color filter 142 to become the second output light. Furthermore, in such a case, the wavelength and intensity of the idler light are in correlation with those of the light to be measured, as described above, and therefore the second output light made up of the idler light component corresponds to the light to be measured.

In a case where the first output light output from the first sampling section 101 is the idler light component generated in the first optical fiber 121, the wavelength of the first output light is $\lambda_2$ (the optical frequency $\omega_2$). Therefore, the wavelength of the idler light generated in the second optical fiber 122, by the four-wave mixing occurring between the second sampling light having a wavelength of $\lambda_0$ (the optical frequency $\omega_0$) and the first output light having a wavelength of $\lambda_2$ (the optical frequency $\omega_2$), becomes $\lambda_1$ (the optical frequency $\omega_1$).

In the manner described above, in the second sampling section 106, the intensity of the first output light input from the first sampling section 101 can be increased by amplifying the intensity of the first output light using the optical parametric amplification in the second optical fiber 122. Therefore, even in a case where the intensity of the first output light obtained through sampling of the light to be measured by the first sampling section 101 is low, the second output light, which is the sampling output light of the light to be measured, can amplify the intensity and the thus amplified intensity can be output, without decreasing the SN ratio of the second output light in relation to the first output light.

By including the second input side polarization control section 112 in the second sampling section 106 in the manner described above, the second sampling section 106 can control the polarization direction of the second sampling light to be substantially the same as that of the first output light. Therefore, the amplification efficiency at a time when the first output light is amplified in the second optical fiber 122 through the optical parametric amplification by the four-wave mixing is substantially maximized, so that the gain in the sampling of the light to be measured is increased.

The optical sampling apparatus 10 is further provided with a photoelectric converter 60 and a waveform displayer 70 that is electrically connected to the photoelectric converter 60, as shown in FIG. 1. The photoelectric converter 60 is disposed on the optical path of the light that passes through the second color filter 142, and receives the second output light, converts the received light into an electrical signal corresponding to the time-intensity component of the received light, and outputs the resulting signal to the waveform displayer 70. The photoelectric converter 60 may be a photoelectric conversion element such as a photodiode, for example. At this time, it is desirable that the wavelength of the light to which the photoelectric converter 60 is most sensitive be substantially the same as the wavelength of the second output light. The waveform displayer 70 displays the electrical signal, according to the repeating period.

As described above, the optical sampling apparatus 10 can measure the pulse waveform of the light to be measured with high sensitivity and high time resolution because the optical sampling apparatus 10 is provided with the first sampling section 101 that can sample the light to be measured with the high time resolution and the second sampling section 106 that can efficiently amplify the intensity of the first output light, which is the output of the sampling obtained by the first sampling section 101.

In the optical sampling apparatus 10, the first color filter 141 disposed in the first sampling section 101 is not limited to being disposed independently at the output side of the first output side polarizing section 131. For example, in a case where the optical coupler 119 of the second sampling section 106 has a surface onto which the first output light falls and a surface onto which the second sampling light falls, the first color filter 141 may be formed in an integrated manner with the surface of the optical coupler 119 onto which the second sampling light falls.

Figure 10:
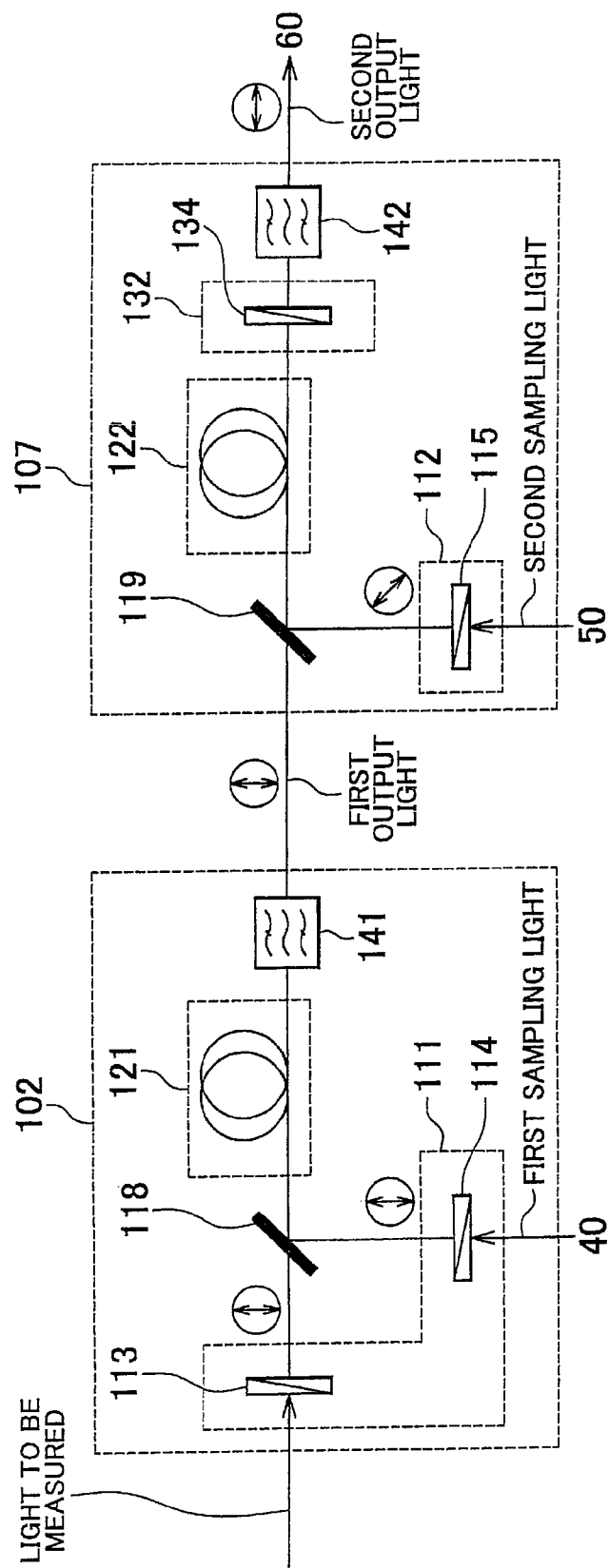
FIG. 10 is a block diagram showing a configuration of a first sampling section 102 and a second sampling section 107.

FIG. 10 is a block diagram showing a configuration of a first sampling section 102 and a second sampling section 107. The optical sampling apparatus 10 described above and with reference to FIGS. 1~9 may be provided with the first sampling section 102 and the second sampling section 107 shown in FIG. 10 instead of the first sampling section 101 and the second sampling section 106. In the first sampling section 102 and the second sampling section 107 shown in FIG. 10, components given the same reference numerals as components of the first sampling section 101 and the second sampling section 106 have substantially the same configuration, and therefore portions of the descriptions of such components are omitted.

The first sampling section 102 includes the first input side polarization control section 111, the optical coupler 118, the first optical fiber 121, and the first color filter 141, as shown in FIG. 10.

The first input side polarization control section 111 controls the polarization directions of the light to be measured that is input to the polarization control element 113 and the first sampling light that is input to the polarization control element 114 such that the light to be measured and the first sampling light become linearly polarized light having substantially the same polarization direction. The light to be measured and the first sampling light, whose polarization directions are controlled by the first input side polarization control section 111, are output towards the optical coupler 118 from the polarization control element 113 and the polarization control element 114, respectively.

In FIG. 10, the polarization directions of the light to be measured and the first sampling light, which are output from the polarization control element 113 and the polarization control element 114, respectively, are indicated by encircled arrows at output sides of the polarization control element 113 and the polarization control element 114. As shown in FIG. 10, in the present embodiment, the polarization directions of the light to be measured and the first sampling light output from the polarization control element 113 and the polarization control element 114 of the first input side polarization control section 111, respectively, are both substantially vertical. However, the polarization directions of the light to be measured and the first sampling light are not limited to being vertical as described in the present embodiment, and may be any direction as long as both directions are controlled by the first input side polarization control section 111 to be substantially the same as each other.

In the embodiment shown in FIG. 10, the first sampling light output from the sampling light output section 20 has a timing and duration appropriate for temporally overlapping with the light to be measured when passing through the first optical fiber 121, described hereinafter. The timing and duration of the first sampling light is adjusted by the modulating section 400, the sampling light width adjusting section 40, and the like of the sampling light output section 20.

The first optical fiber 121 causes the four-wave mixing, which is a nonlinear optical effect, to occur between the first output light and the second sampling light passing through inside the first optical fiber 121 with a temporal overlap. In a case where the intensity of the first sampling light is sufficiently larger than that of the light to be measured, the intensity of the light to be measured is amplified. In this manner, the light to be measured that passes through the first optical fiber 121 becomes light whose intensity is amplified and whose polarization direction is substantially the same as that of the first sampling light. When the intensity of the first sampling light is constant, the amplified intensity of the light to be measured has a correlation with the intensity of the light to be measured before amplification.

In the first optical fiber 121, the idler light having a temporal overlap with the light to be measured and the first sampling light is newly generated through the four-wave mixing. The idler light is generated as linearly polarized light whose polarization direction is substantially the same as that of the light to be measured and the first sampling light. Accordingly, the polarization direction of the idler light is substantially vertical. The intensity of the idler light is the same as the intensity of the light to be measured that is amplified by the optical parametric amplification. Therefore, in a case where the intensity of the first sampling light is constant, the intensity of the idler light also has a correlation with the intensity of the light to be measured before amplification. Furthermore, the difference between the wavelength of the light to be measured and the wavelength of the first sampling light is equal to the difference between the wavelength of the idler light and the wavelength of the first sampling light.

The first color filter 141 is disposed on the optical path of the light that passes through the first optical fiber 121, and has characteristics that allow light having a wavelength with a band that is the same as the wavelength of the light to be measured to pass through. Therefore, from the light passing through the first optical fiber 121, the components of the first sampling light and of the idler light having wavelengths that are different from the wavelength of the light to be measured are absorbed by the first color filter 141, so that only the components having wavelengths that are the same as the wavelength of the light to be measured pass through the first color filter 141. In the following description, the light that passes through the first color filter 141 is referred to as the "first output light."

The second sampling section 107 includes the second input side polarization control section 112, the optical coupler 119, the second optical fiber 122, a second output side polarizing section 132, and the second color filter 142, as shown in FIG. 10.

The second input side polarization control section 112 controls the polarization direction of the second sampling light input into the polarization control element 115 such that the second sampling light becomes linearly polarized light whose polarization direction forms an angle of 40~50 degrees in relation to the polarization direction of the first output light. The second sampling light whose polarization direction is controlled by the second input side polarization control section 112 is output from the polarization control element 115 toward the optical coupler 119.

In FIG. 10, the polarization direction of the second sampling light, which is output from the polarization control element 115, is indicated by the encircled arrow at the output side of the polarization control element 115. As shown in FIG. 10, in the present embodiment, in a case where the polarization direction of the first output light is substantially vertical, for example, it is desirable that the polarization direction of the second sampling light output from the polarization control element 115 of the second input side polarization control section 112 form an angle of substantially 45 degrees from the vertical.

When at least a portion of the input first output light and second sampling light pass through inside the second optical fiber 122 with a temporal overlap, nonlinear optical effects including the optical Kerr effect and the four-wave mixing occur between the input lights. More specifically, when at least a portion of a prescribed pulse of the first output light and a prescribed pulse of the second sampling light pass through inside the second optical fiber 122 with a temporal overlap, the polarization axis of the pulse of the first output light is rotated by the optical Kerr effect, such that the polarization direction of the pulse of the first output light becomes substantially the same as the polarization direction of the pulse of the second sampling light. Here, the rotation of the polarization axis of the first output light as described above does not occur in the entirety of the first output light, but rather occurs only in the portion of the first output light that temporally overlaps with the second sampling light.

In a case where the intensity of the second sampling light is much larger than that of the first output light, the portion of the first output light passing through the second optical fiber 122 whose polarization axis is rotated in the manner described above, in other words, the portion of the first output light that temporally overlaps with the second sampling light, has the intensity thereof amplified by the optical parametric amplification. Here, the light obtained through amplification of the portion of the first output light by the optical parametric amplification is linearly polarized light having a wavelength that is the same as that of the first output light, and the polarization direction thereof is substantially the same as that of the second sampling light. Accordingly, in the present embodiment, the polarization direction of the amplified portion of the first output light has an angle of substantially 45 degrees from the vertical.

In the manner described above, when portions of the first output light and the second sampling light passing through the second optical fiber 122 temporally overlap, the portion of the first output light that passes through the second optical fiber 122 becomes light whose intensity is amplified and whose polarization direction is substantially the same as that of the second sampling light. When the intensity of the second sampling light is constant, the intensity of the amplified portion of the first output light has a correlation with the intensity of the portion of the first output light before amplification.

In the manner described above, when portions of the first output light and the second sampling light passing through the second optical fiber 122 temporally overlap, the idler light having a temporal overlap with the portions of the first output light and the second sampling light is newly generated through the four-wave mixing. The idler light is generated as linearly polarized light whose polarization direction is substantially the same as that of the second sampling light. Accordingly, the polarization direction of the idler light has an angle of substantially 45 degrees from the vertical. The intensity of the idler light is the same as the intensity of the amplified portion of the first output light whose polarization direction is rotated to be substantially the same as that of the second sampling light. Therefore, in a case where the intensity of the second sampling light is constant, the intensity of the idler light has a correlation with the intensity of the portion of the first output light before amplification.

The second output side polarizing section 132 includes a polarization element 134 that is disposed on the optical path of the light passing through the second optical fiber 122. The polarization element 134 absorbs the light having a component whose polarization direction is vertical from among the input light and allows light having a component whose polarization direction is horizontal to pass through. Accordingly, the second sampling light that passes through the second optical fiber 122 has a horizontal component that passes through the polarization element 134, as shown in FIG. 10. Furthermore, the portions of the first output light passing through the second optical fiber 122 that do not temporally overlap with the second sampling light in the second optical fiber 122 are portions whose polarization directions are vertical, and are therefore absorbed by the polarization element 134.

On the other hand, the polarization directions of the portions of the first output light that do temporally overlap with the second sampling light in the second optical fiber 122 are rotated in the manner described above such that the polarization directions are substantially the same as that of the second sampling light, in other words, the polarization directions are rotated to be at an angle of substantially 45 degrees from the vertical, so that the horizontal component of the first output light passes through the polarization element 134. Furthermore, because the idler light generated in the second optical fiber 122 has a polarization direction that is the same as that of the second sampling light, the horizontal component of the idler light passes through the polarization element 134.

The second color filter 142 is disposed on the optical path of the light that passes through the polarization element 134 of the second output side polarizing section 132, and has characteristics that allow only light having a wavelength with a band that is the same as the wavelength of the first output light to pass through. Therefore, from the light passing through the polarization element 134, the components of the second sampling light and of the idler light having wavelengths that are different from the wavelength of the first output light are absorbed by the second color filter 142, so that only the components having wavelengths that are the same as the wavelength of the first output light pass through the second color filter 142. In the following description, the light that passes through the second color filter 142 is referred to as the "second output light."

It should be noted that the second color filter 142 may have characteristics that allow only light having a wavelength with a band that is the same as the wavelength of the idler light to pass through. In such a case, the components of the second sampling light and of the first output light are absorbed by the second color filter 142, so that the idler light component passes through the second color filter 142 to become the second output light. Furthermore, in such a case, the wavelength and intensity of the idler light are in correlation with those of the first output light, as described above, and therefore the second output light made up of the idler light component corresponds to the first output light.

In the second sampling section 107, the portion of the first output light that does not temporally overlap with the second sampling light in the second optical fiber 122 is absorbed by the polarization element 134. Therefore, the SN ratio of the second output light obtained by sampling the pulse waveform of the first output light can be increased.

Furthermore, because the first output light can be sampled with the second sampling light having a very short duration by the second sampling section 107 due to the sampling light output section 20 outputting the pulse light at an order of sub-picoseconds as the second sampling light, the time resolution of the sampling of the first output light by the second sampling section 107 can be enhanced to an order of sub-picoseconds.

As described above, by being provided with the first sampling section 102 and the second sampling section 107 shown in FIG. 10, the optical sampling apparatus 10 can efficiently amplify the intensity of the light to be measured using the first sampling section 102 and can sample the amplified first output light with the high time resolution using the second sampling section 107. Accordingly, the optical sampling apparatus 10 can measure the pulse waveform of the light to be measured with high sensitivity and high time resolution.

The optical sampling apparatus 10 described in relation to FIGS. 1~9 may be provided with the second sampling section 107 instead of the second sampling section 106. In such a case, the optical sampling apparatus 10 is provided with the first sampling section 101 and the second sampling section 107. The second sampling section 107 is the same as the second sampling section 107 described above in relation to FIG. 10, and therefore identical configurations and achievement of the same results are omitted from the following description.

By being provided with the first sampling section 101 and the second sampling section 107, the optical sampling apparatus 10 can sample the light to be measured with the high time resolution using the first sampling section 101 and can re-sample the first output light without lowering the SN ratio thereof using the second sampling section 107. Accordingly, the optical sampling apparatus 10 can measure the light to be measured with the high time resolution.

The optical sampling apparatus 10 described in relation to FIGS. 1~9 may be provided with the first sampling section 102 instead of the first sampling section 101. In such a case, the optical sampling apparatus 10 is provided with the first sampling section 102 and the second sampling section 106. The first sampling section 102 is the same as the first sampling section 102 described in relation to FIG. 10, and therefore identical configurations and achievement of the same results are omitted from the following description.

By being provided with the first sampling section 102 and the second sampling section 106, the optical sampling apparatus 10 can efficiently amplify the intensity of the light to be measured using the first sampling section 102 and can further efficiently amplify the amplified first output light using the second sampling section 106. Accordingly, the optical sampling apparatus 10 can increases the gain in the sampling of the light to be measured.

Figure 11:
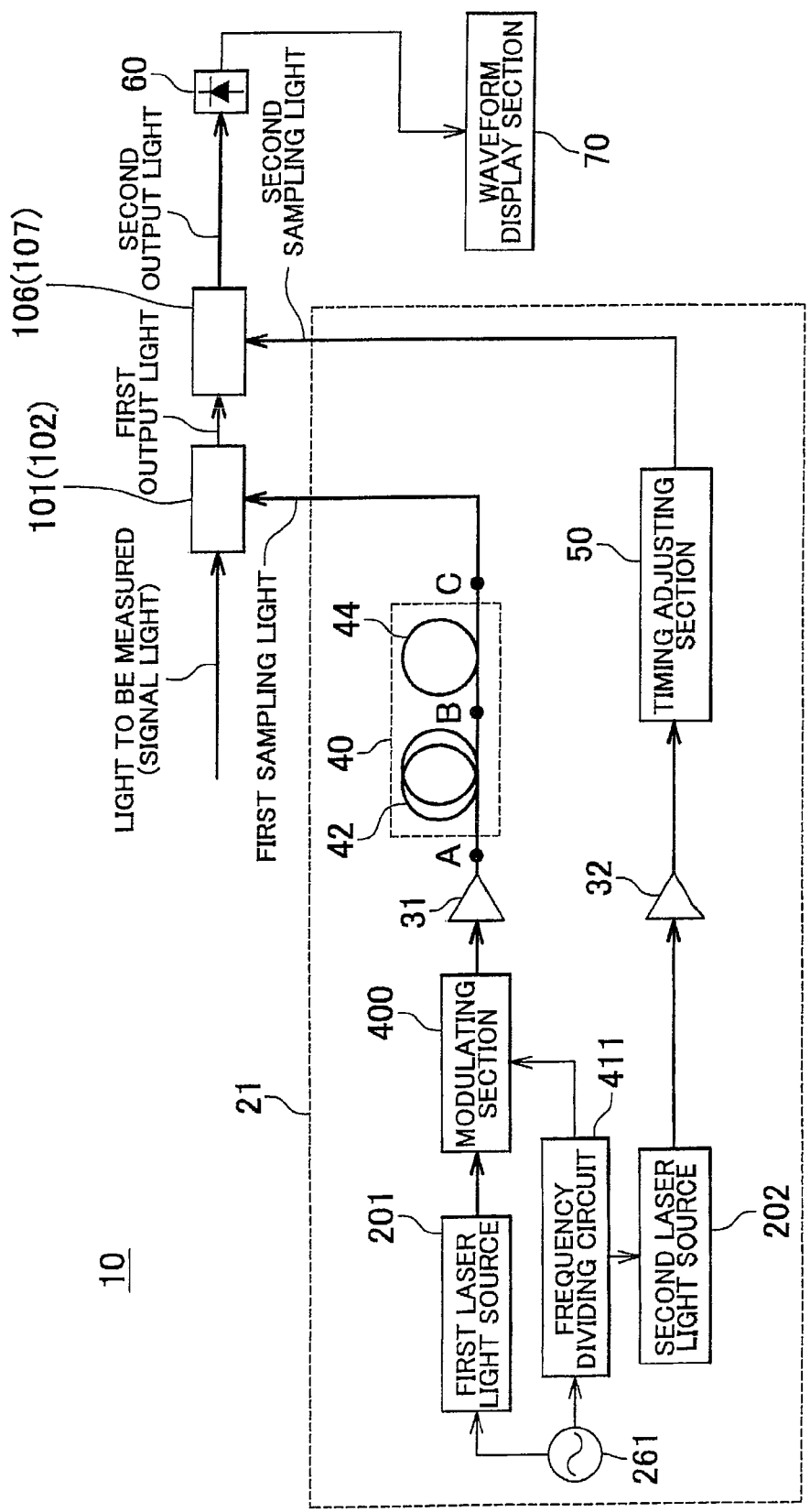
FIG. 11 is a schematic diagram of the optical sampling apparatus 10 provided with the sampling light output section 21.

FIG. 11 is a schematic diagram of the optical sampling apparatus 10 provided with a sampling light output section 21. The optical sampling apparatus 10 described in relation to FIGS. 1~10 may be provided with the sampling light output section 21 shown in FIG. 11 instead of the sampling light output section 20. In the optical sampling apparatus 10 shown in FIG. 11, components given the same reference numerals as components of the optical sampling apparatus 10 shown in FIG. 1 have substantially the same configuration, and therefore the descriptions of such components are omitted.

As shown in FIG. 11, the sampling light output section 21 includes a high frequency current output section 261, a first laser light source 201, a second laser light source 202, and a frequency dividing circuit 411. The first laser light source 201 and the second laser light source 202 are pulse light sources that output a single mode pulse light, and both have configurations identical to that of the laser light source 200 described above. The pulse light output from the first laser light source 201 passes through the modulating section 400, the amplifier 31, and the sampling light width adjusting section 40 to be input into the first sampling section 101 (102) as the first sampling light. The pulse light output from the second laser light source 202 passes through the amplifier 32 and the timing adjusting section 50 to be input into the second sampling section 106 (107) as the second sampling light.

The high frequency current output section 261 is electrically connected to a current amplifying circuit, not shown, of the first laser light source 201 and to the frequency dividing circuit 411. The high frequency current output section 261 outputs a high frequency current having a prescribed frequency, in the same manner as the high frequency current output section 260 described above. The frequency of the high frequency current output by the high frequency current output section 261 can be changed as desired.

The frequency dividing circuit 411 frequency divides the high frequency electrical signal output from the high frequency current output section 261 into N periods (N is a positive integer) and outputs the resulting electrical signal to the modulating section 400 and the current amplifying circuit, not shown, of the second laser light source 202. The modulating section 400 outputs pulse light obtained by frequency dividing a repeating period of the pulse light output from the first laser light source 201 by n, according to the frequency of the electrical signal input from the frequency dividing circuit 411. The second laser light source 202 outputs pulse light having a repeating frequency obtained by frequency dividing the frequency of the electrical signal input from the frequency dividing circuit 411, in other words, the repeating frequency of the high frequency electrical signal output from the high frequency current output section 261, by n.

Figure 12:
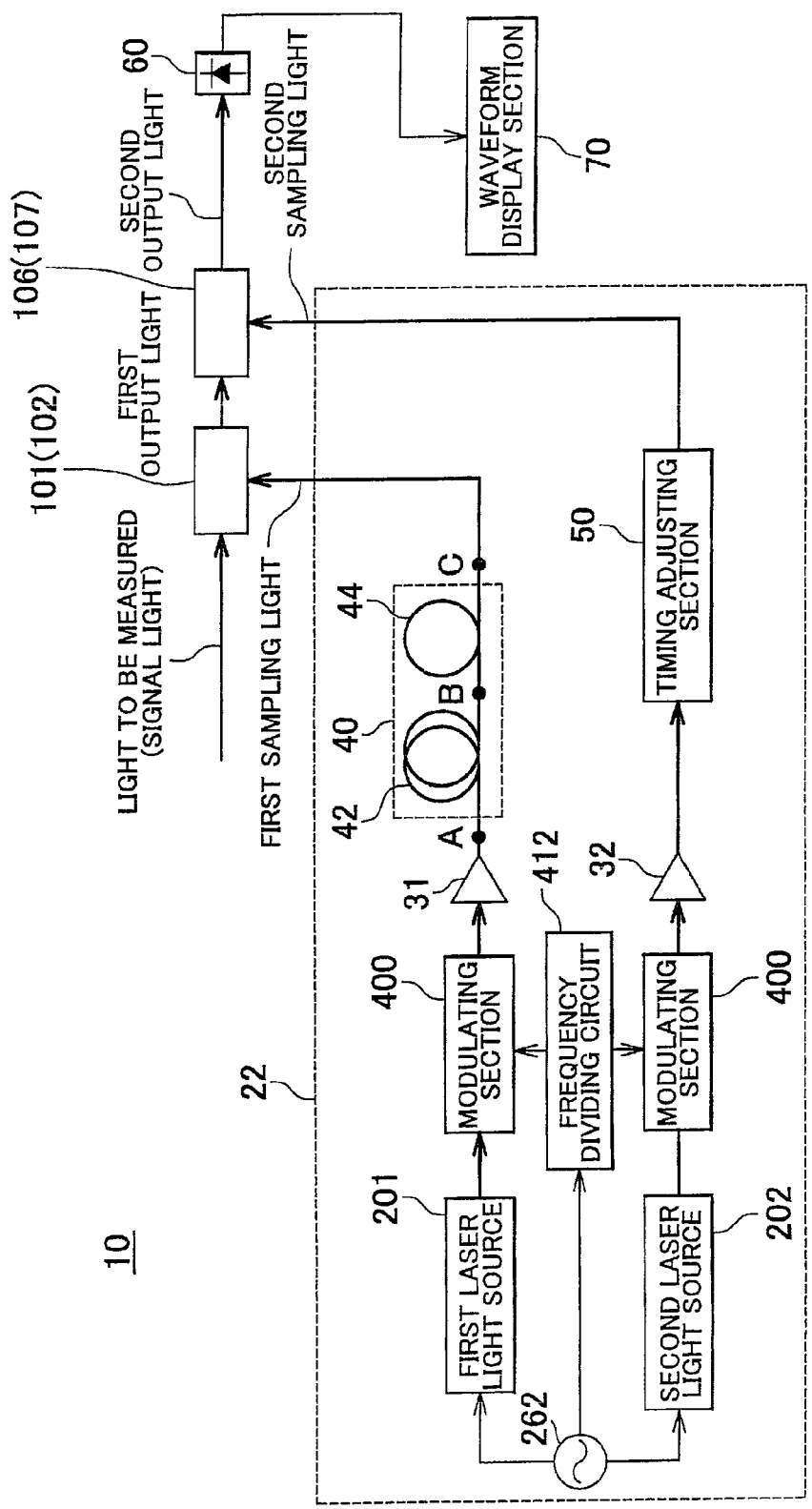
FIG. 12 is a schematic diagram showing the optical sampling apparatus 10 provided with the sampling light output section 22.

FIG. 12 is a schematic diagram showing the optical sampling apparatus 10 provided with the sampling light output section 22. The optical sampling apparatus 10 described in relation to FIGS. 1~10 may be provided with the sampling light output section 22 shown in FIG. 12 instead of the sampling light output section 20. In the optical sampling apparatus 10 shown in FIG. 12, components given the same reference numerals as components of the optical sampling apparatus 10 shown in FIG. 1 have substantially the same configuration, and therefore the descriptions of such components are omitted.

The sampling light output section 22 includes a high frequency current output section 262, the first laser light source 201, the second laser light source 202, and a frequency dividing circuit 412, as shown in FIG. 12. The first laser light source 201 and the second laser light source 202 are pulse light sources that output a single mode pulse light, and both have configurations identical to that of the laser light source 200 described above. The pulse light output from the first laser light source 201 passes through one of two modulating sections 400, the amplifier 31, and the sampling light width adjusting section 40 to be input into the first sampling section 101 (102) as the first sampling light. The pulse light output from the second laser light source 202 passes through the other of two modulating sections 400, the amplifier 32, and the timing adjusting section 50 to be input into the second sampling section 106 (107) as the second sampling light.

The high frequency current output section 262 is electrically connected to the current amplifying circuit, not shown, of the first laser light source 201, to the current amplifying circuit, not shown, of the second laser light source 202, and to the frequency dividing circuit 412. The high frequency current output section 262 outputs a high frequency current having a prescribed frequency, in the same manner as the high frequency current output section 260 described above. The frequency of the high frequency current output by the high frequency current output section 262 can be changed as desired.

The frequency dividing circuit 412 frequency divides the high frequency electrical signal output from the high frequency current output section 262 into N periods (N is a positive integer) and outputs the resulting electrical signal to a modulating section 400. The modulating sections 400, which are disposed at the output sides of the first laser light source 201 and the second laser light source 202, respectively, output pulse light obtained by frequency dividing a repeating period of the pulse light output from the first laser light source 201 and the second laser light source 202, respectively, by n, according to the frequency of the electrical signal input from the frequency dividing circuit 412.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. An optical sampling apparatus that samples light to be measured having a pulse waveform, comprising:
    a sampling light output section that outputs a first sampling light and a second sampling light, both having pulse waveforms of a spectrum different from that of the light to be measured;
    a first sampling section that includes a first nonlinear optical medium, which causes a nonlinear optical effect by causing at least a portion of the light to be measured and the first sampling light to pass therethrough and outputs light generated by the nonlinear optical effect, and that outputs at least a portion of the light generated by the nonlinear optical effect as a first output light; and
    a second sampling section that includes a second nonlinear optical medium, which causes a nonlinear optical effect by causing at least a portion of the first output light and the second sampling light to pass therethrough with a temporal overlap in order to output light generated by the nonlinear optical effect, and that outputs at least a portion of the light generated by the nonlinear optical effect as a second output light.

2. The optical sampling apparatus according to claim 1, wherein at least one of the light generated by the nonlinear optical effect of the first nonlinear optical medium and the light generated by the nonlinear optical effect of the second nonlinear optical medium includes light generated by four-wave mixing.

3. The optical sampling apparatus according to claim 1, wherein
    the first sampling section further includes a first color filter that eliminates at least a spectrum component of the light to be measured from the light output from the first nonlinear optical medium, and
    the second sampling section further includes a second color filter that eliminates at least a spectrum component of the second sampling light from the light output from the second nonlinear optical medium.

4. The optical sampling apparatus according to claim 3, wherein the second color filter further eliminates a spectrum component of the first output light from the light output from the second nonlinear optical medium.

5. The optical sampling apparatus according to claim 1, wherein the first sampling section includes:
    a first input side polarization control section that controls the light to be measured and the first sampling light to have polarization directions that form an angle of 40~50 degrees with each other, and that inputs the thus controlled light to be measured and first sampling light into the first nonlinear optical medium;
    a first output side polarizing section that allows to pass through only light whose polarization direction is perpendicular to the polarization direction of the light to be measured, which is input into the first nonlinear optical medium, from the light that passes through the first nonlinear optical medium; and
    a first color filter that eliminates at least a spectrum component of the first sampling light from the light that passes through the first output side polarizing section.

6. The optical sampling apparatus according to claim 1, wherein the second sampling section includes:
    a second input side polarization control section that controls the first output light output from the first sampling section and the second sampling light to have polarization directions that form an angle of 40~50 degrees with each other, and that inputs the thus controlled first output light and second sampling light into the second nonlinear optical medium;
    a second output side polarizing section that allows to pass through only light whose polarization direction is perpendicular to the polarization direction of the first output light input into the second nonlinear optical medium, from the light that passes through the second nonlinear optical medium; and
    a second color filter that eliminates at least a spectrum component of the second sampling light from the light that passes through the second output side polarizing section.

7. The optical sampling apparatus according to claim 1, wherein
    the first sampling section further includes:
        a first input side polarization control section that controls the light to be measured and the first sampling light to have polarization directions that form an angle of 40~50 degrees with each other; and
        a first output side polarizing section that allows to pass through only light whose polarization direction is perpendicular to the polarization direction of the light to be measured, which is input to the first nonlinear optical medium, from the light that passes through the first nonlinear optical medium, and
    the second sampling section further includes:
        a second input side polarization control section that controls the first output light output from the first sampling section and the second sampling light to have polarization directions that form an angle of 40~50 degrees with each other;
        a second output side polarizing section that allows to pass through only light whose polarization direction is perpendicular to the polarization direction of the first output light input into the second nonlinear optical medium, from the light that passes through the second nonlinear optical medium; and
        a second color filter that eliminates at least a spectrum component of the second sampling light from the light that passes through the second output side polarizing section.

8. The optical sampling apparatus according to claim 1, wherein the first sampling section further includes a first color filter that eliminates a spectrum component of the first sampling light from the light that passes through the first nonlinear optical medium.

9. The optical sampling apparatus according to claim 1, wherein the first sampling light and the second sampling light have pulse waveforms and durations that are different from each other.

10. The optical sampling apparatus according to claim 1, further comprising a timing adjusting section that controls a timing at which the second sampling light passes through the second nonlinear optical medium.

11. An optical sampling apparatus that samples light to be measured having a pulse waveform, comprising:
   a sampling light output section that that outputs a first sampling light and a second sampling light, both having pulse waveforms of a spectrum different from that of the light to be measured;
   a first sampling section that includes,
      a first light receiving section that receives the light to be measured;
      a second light receiving section that receives the first sampling light; and
      a first nonlinear optical medium that generates a first output light created from the light to be measured and the first sampling light, and that outputs the generated first output light; and
   a second sampling section, that is connected serially to the first sampling section, and that includes,
      a first light receiving section that receives the first output light;
      a second light receiving section that receives the second sampling light; and
      a second nonlinear optical medium that generates a second output light from the first output light and at least a portion of the second sampling light that passes through having a temporal overlap with the first sampling light, and that outputs the generated second output light.

* * * * *